(12) United States Patent
Gandhi et al.

(10) Patent No.: US 6,833,894 B2
(45) Date of Patent: Dec. 21, 2004

(54) ENHANCED CONTRAST RATIO FOR TWISTED NEMATIC LIQUID CRYSTAL DEVICES

(75) Inventors: Jignesh V. Gandhi, Stow, OH (US); Michael E. Stefanov, Stow, OH (US)

(73) Assignee: HANA Microdisplay Technologies, Inc, Twinsburg, OH (US)

(*) Notice: Subject to any disclaimer, the term of this patent is extended or adjusted under 35 U.S.C. 154(b) by 119 days.

(21) Appl. No.: 09/758,775

(22) Filed: Jan. 11, 2001

(65) Prior Publication Data

US 2002/0126242 A1 Sep. 12, 2002

(51) Int. Cl.[7] .......................................... G02F 1/1335
(52) U.S. Cl. .......................................... 349/117; 349/5
(58) Field of Search ............................. 349/5, 117

(56) References Cited

U.S. PATENT DOCUMENTS

| | | | | |
|---|---|---|---|---|
| 4,408,839 | A | * 10/1983 | Wiener-Avnear | 349/76 |
| 5,089,906 | A | * 2/1992 | Ohnishi et al. | 349/121 |
| 5,490,003 | A | * 2/1996 | Van Sprang | 349/96 |
| 5,576,854 | A | * 11/1996 | Schmidt et al. | 349/5 |
| 6,219,122 | B1 | * 4/2001 | Uchida et al. | 349/117 |
| 6,359,671 | B1 | * 3/2002 | Abileah | 349/119 |
| 2002/0063818 | A1 | * 5/2002 | Anderson et al. | 349/96 |

OTHER PUBLICATIONS

A.E. Rosenbluth, et al., "Contrast Properties of Reflective Liquid Crystal Light Valves in Projection Displays", IBM Journal of Research & Development, vol. 42, No. 3—High Resolution Displays, Nov. 15, 2000, pp. 2, 8–9, 33.
H.Yang, et al., "Nematic LC Modes and LC Phase Gratings for ReflectiveSpatial Light Modulators", IBM Journel of Research & Development, vol. 42, No. 3—High Resolution Displays, Nov. 15, 2000, pp. 3–6, 8.
J.L. Sanford, et al., "A One–Megapixel Reflective Spatial Light Modulator System for Holographic Storage", IBM Journal of Research & Development, vol. 42, No. 3—High Resolution Displays, Nov. 7, 2000, pp. 1–4, 6.

* cited by examiner

Primary Examiner—Robert H. Kim
Assistant Examiner—P. R. Akkapeddi
(74) Attorney, Agent, or Firm—Roetzel & Andress (57) ABSTRACT

A high contrast twisted nematic liquid crystal cell in which outgoing or reflected light is linearly polarized and has the same polarization angle as incoming or incident light when the cell is in an off state. Matching the polarization axes of incoming and outgoing light allows less light to pass through a final analyzer with the cell in an off state to provide a darker off state, and allows more light through with the cell in an on state, resulting in an enhanced contrast ratio display. A method of determining placement of optical retarders for enhanced contrast in a reflective twisted nematic liquid crystal display device is also described.

12 Claims, 10 Drawing Sheets

ENHANCED CONTRAST RATIO FOR TWISTED NEMATIC LIQUID CRYSTAL DEVICES

FIELD OF THE INVENTION

The present invention pertains generally to liquid crystal microdisplays systems and, more particularly, to achieving higher contrast in microdisplay systems having a twisted nematic cell design.

BACKGROUND OF THE INVENTION

Microdisplays are the most recent addition to the family of flat-panel displays. While microdisplays are based on a number of different techniques to generate modular light, all are based on the use of microfabrication technologies to produce a rectangular array of pixels on a semiconductor back plane. Examples of microdisplays include liquid crystal displays, field emission displays, and digital micro-mirror displays.

At present, liquid crystal display (LCD) devices have found varieties of applications as a thin full color display. The very first types of LCDs used DSM (dynamic scattering mode), but twisted nematic (TN) mode has become the standard today. Almost all active matrix drive displays use TN type LCDs. A typical TN device comprises nematic liquid crystal sandwiched between two substrates at least one of which is transparent. Transmissive TN devices comprise two glass substrates. A special surface treatment is given to each glass substrate such that the molecules are parallel to each substrate yet the director at the top of the device is perpendicular to the director at the bottom. This configuration sets up a 90° twist into the bulk of the liquid crystal, hence the name twisted nematic display. The amount of the twist can be varied by changing the treatment angle given to each substrate. Different twist angle values give significantly different optical properties. Typical twist angles range from 45° to 270° depending on application. In a typical reflective type TN display used for microdisplays, director at the bottom is rotated 45° from the director at the top. The light will pass through the liquid crystal before and after being reflected off a pixel surface on bottom substrate of the device.

The underlying principle in a normally black reflective TN display is the manipulation of polarized light. If no voltage is applied, the liquid crystal (LC) molecules of the cell are aligned parallel to the alignment surfaces. Before entering the cell, light passes through a polarizer that is aligned with the LC molecules on the top surface. When polarized light enters the cell, its polarization changes so that immediately prior to being reflected, the light has nearly circular polarization. After being reflected, the light reverses its direction and emerges from the cell in nearly the same polarization state in which it entered the cell. In a normally black TN LCD, an analyzer, rotated by 90° with respect to the polarizer, is placed in the output path of the light reflected from the LC cell. Because the analyzer is rotated 90°, light will not pass through the analyzer when the cell is in off state. In the bright state or the on state of the device, LC molecules tend to orient with the applied electric field. The light emerging from the cell is therefore rotated nearly 90° from the polarized light entering the cell. Because the exiting light is rotated close to the analyzer direction, most of the light will pass through the analyzer only when the cell is on.

Reflective LCD microdisplays are used in a many projection and virtual view applications. These applications include: multimedia front projectors, rear-projection computer monitors, rear-projection televisions, and near-to-the-eye (NTE) displays. Light valves that are reflective provide important advantages in projection displays. Controlling circuitry placed below the mirror surface does not obstruct the clear aperture. More advanced IC technology is available for substrate materials that are opaque, and a more compact system may be achieved when the reflected output beam is folded back on the input. One particular type of reflective LC technology, the liquid-crystal-on-silicon (LCoS) microdisplay, is emerging as an attractive choice for such applications. The advantage of LCoS over other reflective LC devices is that the LCoS provides high performance, high-information-content microdisplays at significantly lower cost than competing technologies.

Currently, reflective TN LCDs have sufficient brightness and contrast for use in high definition projection applications. Normally black (NB) LC modes, since they offer higher contrast with low drive voltages as compared to normally white (NW) modes, are more readily adaptable for use in such applications. Projection systems utilizing transmissive LCDs have been able to obtain very high contrast ratios because the sheet polarizer and analyzer are separated (with inherently high contrast ratio greater than 1000:1) and not limited by a polarizing beamsplitter element ubiquitous in reflective projection optical systems. Contrast ratio is the ratio of the luminance of the bright state to the luminance of the dark state of the device. This polarizing beamsplitter element used in on-axis systems has limited acceptance angle. Consequently, system brightness and contrast are limited. In an off-axis reflective projection design, light input and output paths are spatially separated (like transmissive design) and a beam splitter cube is not required. One off-axis reflective projection design obtained total contrast ratio of greater than 400:1. (M. Bone et. al., SID $5^{th}$ Annual Flat Panel Strategic Symposium, p81, 1998).

Furthermore, the contrast ratio decreases as the viewing angle increases due to the birefringent properties of the LC. Therefore, even an off-axis design has an inherent reduction in contrast as a function of the viewing angle. In order to increase brightness, the F# of the LCD system must be reduced (the aperture must be increased). The F# is defined as $1/(2 \tan(\theta))$ where $\theta$ is the half angle of the viewing cone. Unfortunately, a reduction in F# has a negative impact on the contrast of the system. Therefore, it is desirable to design an easily manufacturable TN LCD system that has improved contrast ratio performance without decreased optical performance and brightness in low F# or high brightness projection systems.

SUMMARY OF INVENTION

In projection systems utilizing reflective CMOS microdisplays or LCoS microdisplays where the polarizer and analyzer are separated (i.e. off-axis), retarder(s) or retardation film(s) or compensation film(s) are introduced in the output light path between the LCD and an analyzer, thereby yielding contrast ratios of greater than 500:1. The retarders function to alter the polarization of light reflected by the liquid crystal cell such that high contrast is obtained.

In accordance with one general aspect of the invention, there is provided a light valve for use in high contrast reflective microdisplays, comprising a twisted nematic mode reflective liquid crystal cell, a color filter positioned to accept non-polarized light incident to the light valve, a linear polarizer positioned between said color filter and said liquid crystal cell, an analyzer positioned in the path of the light reflected by said liquid crystal cell, and retarders positioned between said liquid crystal cell and said analyzer in the path of the light reflected by said liquid crystal cell. Light incident to the light valve is generally off-axis to said liquid crystal cell and said retarders function to decrease ellipticity and alter the polarization axis of light reflected by said liquid crystal cell.

In accordance with another general aspect of the invention, there is provided a light valve for use in high contrast reflective microdisplays, comprising a twisted nematic mode reflective liquid crystal cell, a color filter positioned to accept non-polarized light incident to the light valve, a linear polarizer positioned between said color filter and said liquid crystal cell, an analyzer positioned in the path of the light reflected by said liquid crystal cell; and a single retarder positioned between said liquid crystal cell and said analyzer in the path of the light reflected by said liquid crystal cell. Light incident to the light valve is generally off-axis to said liquid crystal cell and said retarder functions to decrease ellipticity and alter the polarization axis of light reflected by said liquid crystal cell.

In accordance with another general aspect of the invention, there is provided a method for improving the contrast of an off-axis light valve having a color filter, a linear polarizer, a twisted nematic mode reflective liquid crystal cell, and an analyzer. The polarization state of light after being reflected by said liquid crystal cell and before passing through said analyzer is determined. A first point representing a first polarization state of light reflected by said liquid crystal cell is plotted on a sphere (using the Poincare Sphere representation of the polarization state of light) and a retarder angle for a first retarder is chosen. A first retarder point is plotted on the sphere representing the chosen retarder angle. A first circle is then drawn on the surface of the sphere centered at the first retarder point and having along its radius said first point. A second point is determined as the intersection of said first circle with a plane passing through a line representing the linear polarization state of the analyzer. The retardation value of said first retarder is calculated as a function of the number of radians from said first point to said second point and the wavelength of light reflected by the liquid crystal cell. After passing through said first retarder, light will have a polarization state represented by said second point. A second retarder point representing a chosen retarder angle of a second retarder is plotted on said sphere. A second circle may then be drawn around said plane centered at said second retarder point. A third point is determined as the point along said second circle radius at the intersection of said second circle with said line representing the linear polarization state of the analyzer. The retarder value of the second retarder is calculated as a function of the number of radians from said second point to said third point and the wavelength of light reflected by the liquid crystal cell. The first and second retarders having chosen retarder angles and calculated retarder values are then placed between said analyzer and said liquid crystal cell in the path of light reflected by the liquid crystal cell.

DETAILED DESCRIPTION OF PREFERRED AND ALTERNATE EMBODIMENTS

Figure 1:
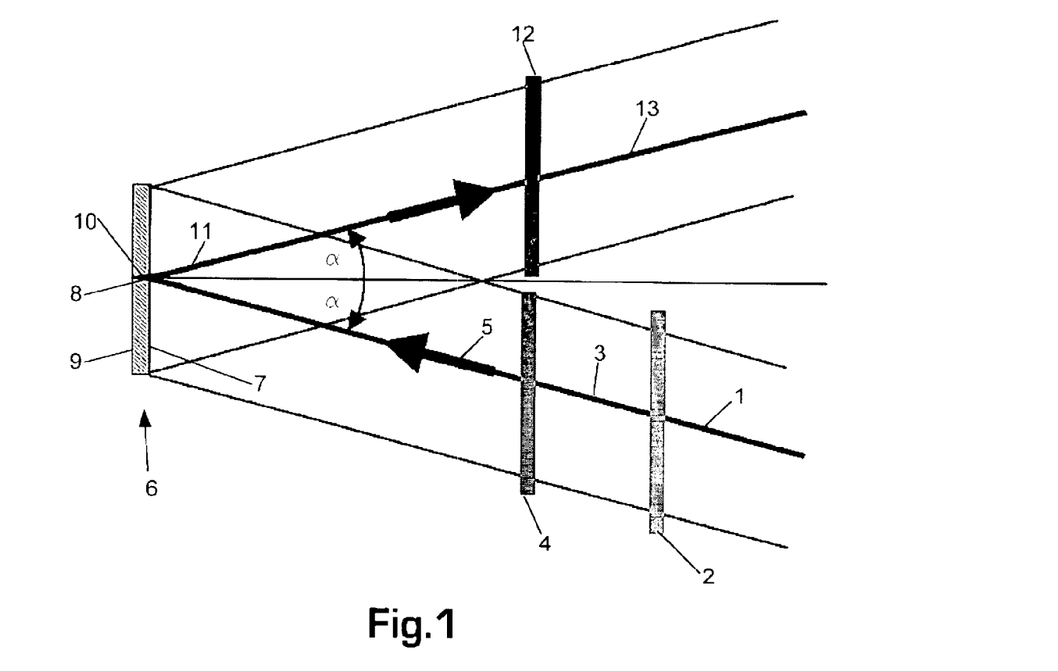
FIG. 1 is a light valve utilizing a standard off-axis reflective TN-LCD configuration.
Figure 2:
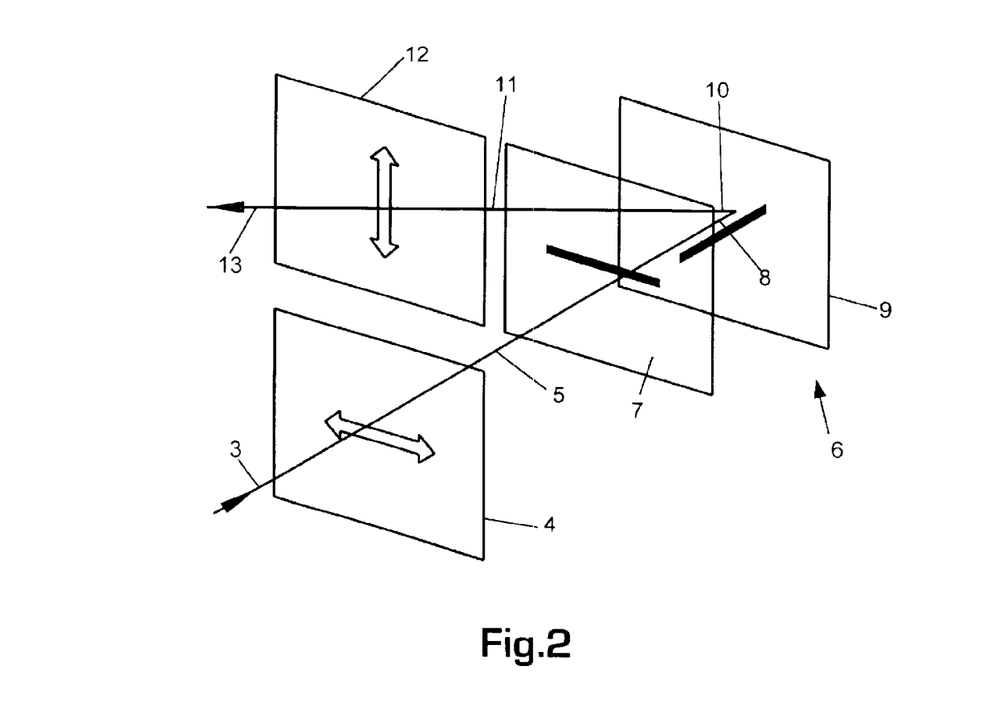
FIG. 2 is a perspective view of a light valve utilizing a standard off-axis reflective TN-LCD configuration.

FIGS. 1 and 2 represent a standard off-axis reflective normally black 45° TN-LCD light valve. Light 1 emitted from a light source enters the optical assembly at 15° off-axis and passes through a color filter 2. The color filter 2 separates the non-polarized light 1 into the color bands of red, green and blue. The color-separated light 3 then passes through a linear polarizer 4, which converts the non-polarized light 3 to linearly polarized light 5. The polarizer 4 is aligned with the rubbing direction of the top surface 7 of the LC cell, which in this case is 0°. Typically a 0° angle is required by the optical and LC mode design. The polarizer 4 and LC cell 6 may be rotated at any angle so long as the polarizer 4 and the rubbing direction of the top surface 7 of the LC cell 6 are aligned.

LC cell 6 has a top surface 7 and a bottom surface 9, the top surface having a rubbing direction aligned with polarizer 4 and the bottom surface 9 having a rubbing direction at a 45° angle with the rubbing direction of the top surface 7. When no voltage is applied to the LC cell, the liquid crystal (LC) molecules of LC cell 6 align parallel to the alignment surfaces. Therefore, the LC molecules rotate or twist 45° from the top surface 7 to the bottom surface 9. If the incident light were on-axis, or normal to LC cell 6, the polarization of light 8 would follow the liquid crystal director configuration. The polarization of light 8, immediately prior to being reflected by bottom surface 9, would have a circular polarization that is rotated 45° from the polarization of light 5. Immediately after being reflected, light 10 would have a reverse polarization of light 8. Light 10 would also follow the director configuration so that when it emerges from LC cell 6, light 10 would be in nearly the same polarization state as was light 5 as it entered LC cell 6.

If LC cell 6 were switched ON, LC molecules would tend to orient with the applied electric field, which is perpendicular to top surface 7 and bottom surface 9. After reflection, the polarization light 10 would be nearly linear again as it exits LC cell 6, but would be rotated almost 90°. The light 11 emerging from LC cell 6 would therefore be rotated nearly 90° from the polarized light 5 entering LC cell 6, and would thus be nearly linearly polarized light. Because both the exiting light and the analyzer are rotated 90° from the polarization direction of the incoming light, light will pass through the analyzer only when the cell is on.

An ideal 45° TN-LCD design would produce light 11 in the exact same polarization state as light 5 when LC cell 6 is in the off or 0 voltage state, and rotated 90° from the polarization state of light 5 in the on state. However, no such cell exists. The first problem with the ideal design is that it requires normal incident light. In order to achieve normal incident light with a reflective LCD, a beam splitter must be utilized. Beam splitters reduce overall system contrast when higher brightness is warranted. The birefringence of LC is dependent on the angle that the light propagates through the cell. The exiting light 11 would not have the same polarization of light 5 if the incident light is off-axis. Hence in an off-axis system design in the off state, light 11 would be slightly elliptically polarized, even though incident light 5 is linearly polarized. In the on state, light 11 is still slightly elliptically polarized, but is close to being rotated 90° from light 5.

Figure 3:
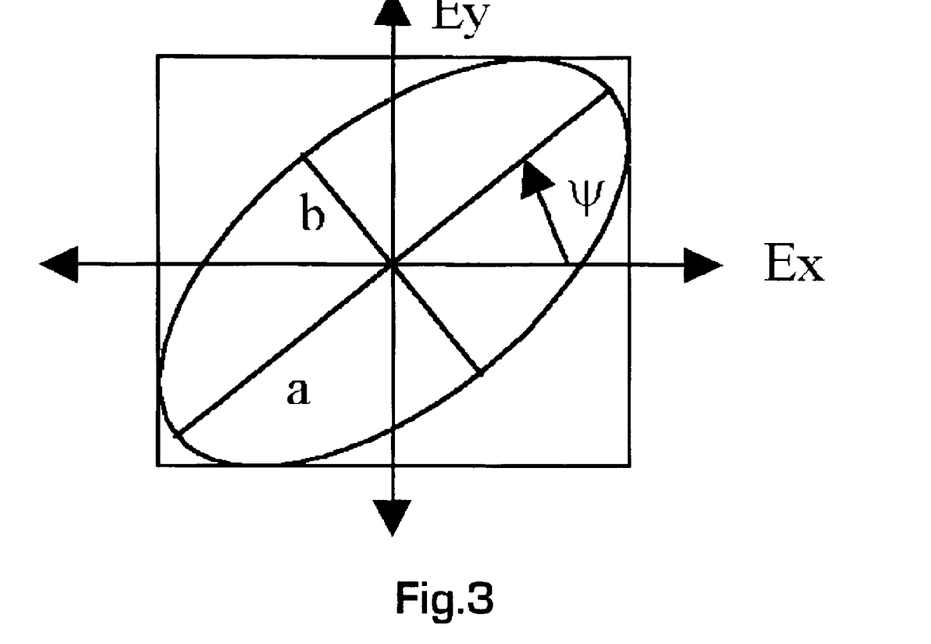
FIG. 3 is a depiction of elliptically polarized light.

FIG. 3 is a representation of elliptically polarized light. Light polarization can be described in general as elliptical polarization. When light is elliptically polarized, the two orthogonal components, Ex and Ey, both vibrate at the frequency of light. The tip of the resultant component of Ex and Ey then moves in the space in such a way that it describes an ellipse. The major axis of the ellipse has length is 'a' and the minor axis has length 'b'. The major axis angle ($\psi$) of the ellipse is the angle of the major axis with respect to Ex. The ellipticity of the ellipse is described as 'b/a'. Linearly polarized light along the x-axis will have ellipticity of 0 and major axis angle of 0. Linearly polarized light along 45° angle will have ellipticity of 0 and major axis angle of 45 degree. Circularly polarized light will show up as a circle in the above diagram where a=b. In the case of circular polarization, ellipticity is 1 and major axis angle has no meaning.

Figure 4:
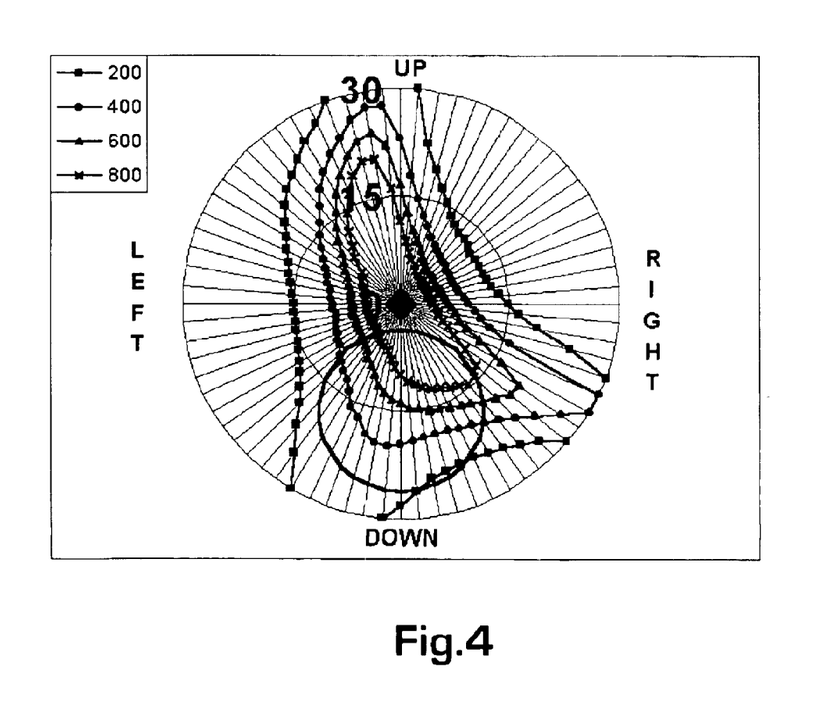
FIG. 4 is an iso-contrast plot for a 45-degree TN-LCD in a standard off-axis reflective TN-LCD configuration.

FIG. 4 shows calculated iso-contrast curves for the light valve depicted in FIG. 1 where light 1 is green waveband centered at 550-nm. Radial direction is the polar viewing angle (0°–30°) and the azimuthal angle is depicted on the circular scale. The variation in contrast is significant as azimuthal angle and polar angle vary. The black circle in the lower half of the image depicts the viewing cone of the off-axis system. The size of the viewing cone depends on the F# of the system. This circle represents an F# of 2.5. The high contrast region is mostly located in the center of the image, away from the viewing cone of the off-axis system.

The average contrast can be calculated by averaging the bright and dark states of positions inside the black circle. The size of the circle can be varied to represent different F# values.

Figure 5:
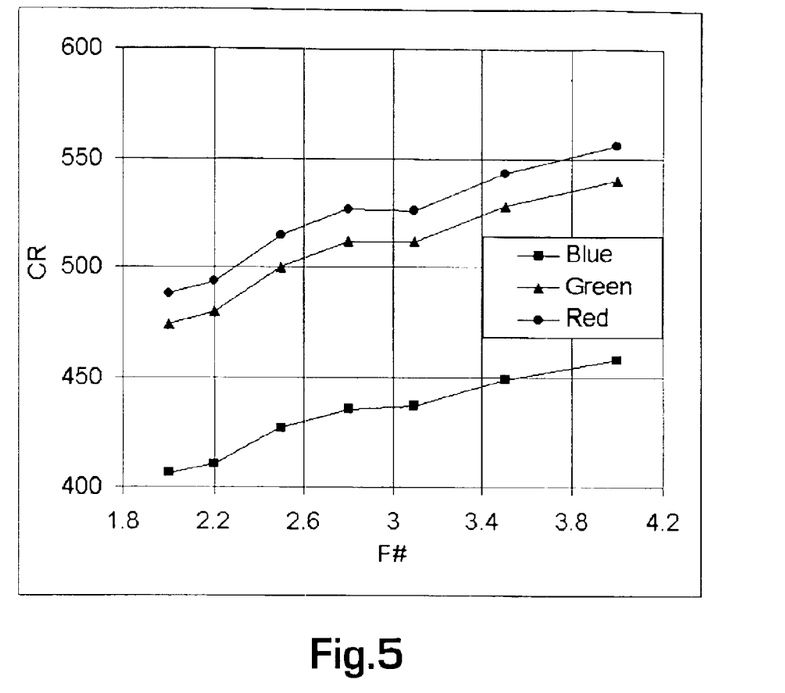
FIG. 5 is plot of contrast ratio variation as a function of F# for a 45-degree TN-LCD in a standard off-axis reflective TN-LCD configuration.

FIG. 5 is a plot of the calculated contrast ratio as a function of F# of the system, showing insufficient contrast ratio for use in high definition projection display devices operating at small F# values or higher brightness systems.

Figure 6:
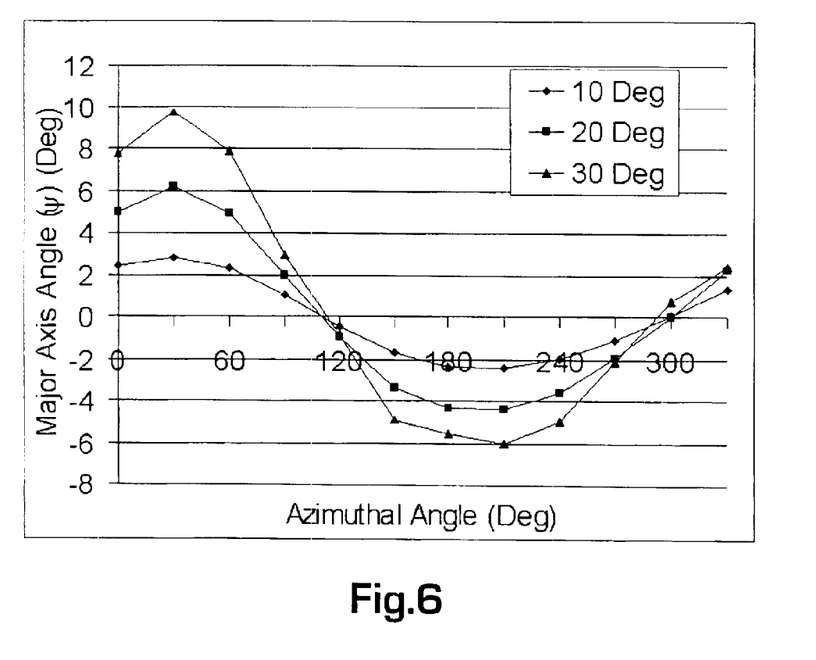
FIG. 6 is a plot of the deviation of the major axis of polarization of light as a function of azimuthal angle for several polar angles.

Because the light valve of FIG. 1 is an off-axis design, the reflected light 11 is elliptically polarized, and its polarization axis is tilted away from the direction of polarization of incident light 5. FIG. 6 shows a plot of the deviation of the polarization axis of reflected light 11 from the polarization axis of incident light 5 as a function of the azimuthal angle for several polar angles. It clearly shows that at certain azimuthal angles at large polar angles, the polarization axis of the reflected light deviates significantly from the polarization axis of incident light 5.

Figure 7:
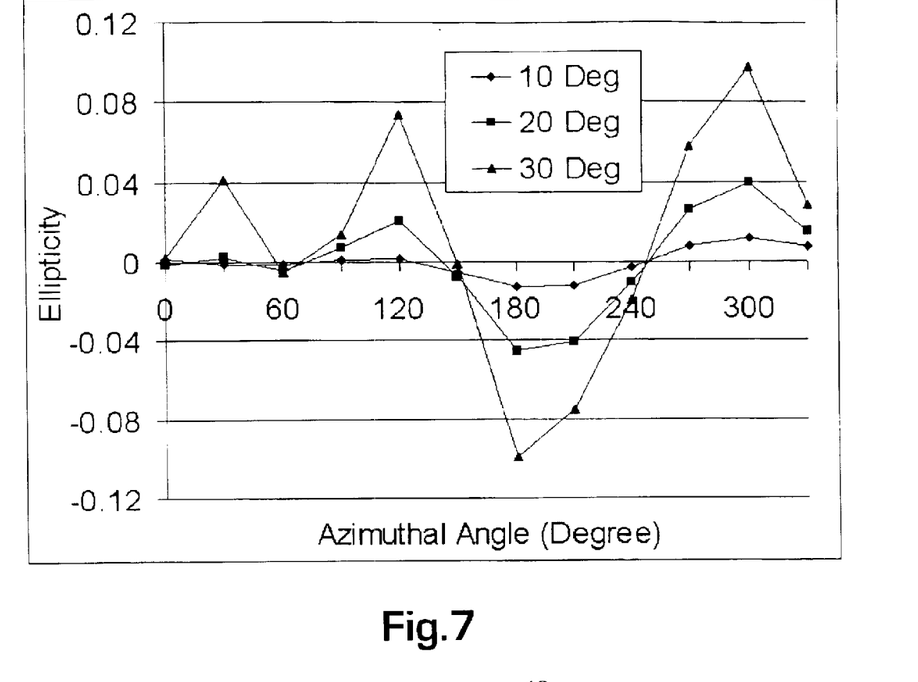
FIG. 7 is a plot of the deviation of the ellipticity of reflected light as a function of azimuthal angle for several polar angles.

FIG. 7 shows a plot of the ellipticity of reflected light 11 as a function of the azimuthal angle for several polar angles. At certain angles the reflected light is significantly elliptic. Both the deviation of polarization axis between incident light 5 and reflected light 11, and the ellipticity of reflected light 11 cause a light leakage at off-angle incidence. Because light 11 exhibits an ellipticity and a deviation of axis of polarization from light 5 when LC cell 6 is in the off state, analyzer 12 is unable to completely block light 11, thereby allowing some light 13 to exit the system. When LC cell 6 is in the on state, analyzer 12 filters only a portion of light 11. Therefore, too much light 13 exits the system when LC cell 6 is in the off state and not enough light 13 exits the system when LC cell 6 is in the on state. This decreased difference in light 13 between the off state and the on state causes a low contrast ratio, thereby making the device unsuitable for use in high definition projection systems. It should be noted the contrast ratio degradation mainly comes from the degradation of the off state of the device.

A careful observation of FIGS. 6 and 7 reveals that in the light leakage is mainly due the deviation of the major axis of the elliptical polarization. The ellipticity becomes significant at larger angles. In order to obtain a higher contrast ratio, light 11 must be linearly polarized light having the same polarization angle as incident light 5 when LC cell 6 is in the off state. To obtain higher contrast, phase retardation may be introduced. According to the present invention, either one or two optical retarder(s) may be introduced in the output path between LC cell 6 and analyzer 12 to convert the polarization of reflected light 11 before it hits the analyzer.

Figure 8:
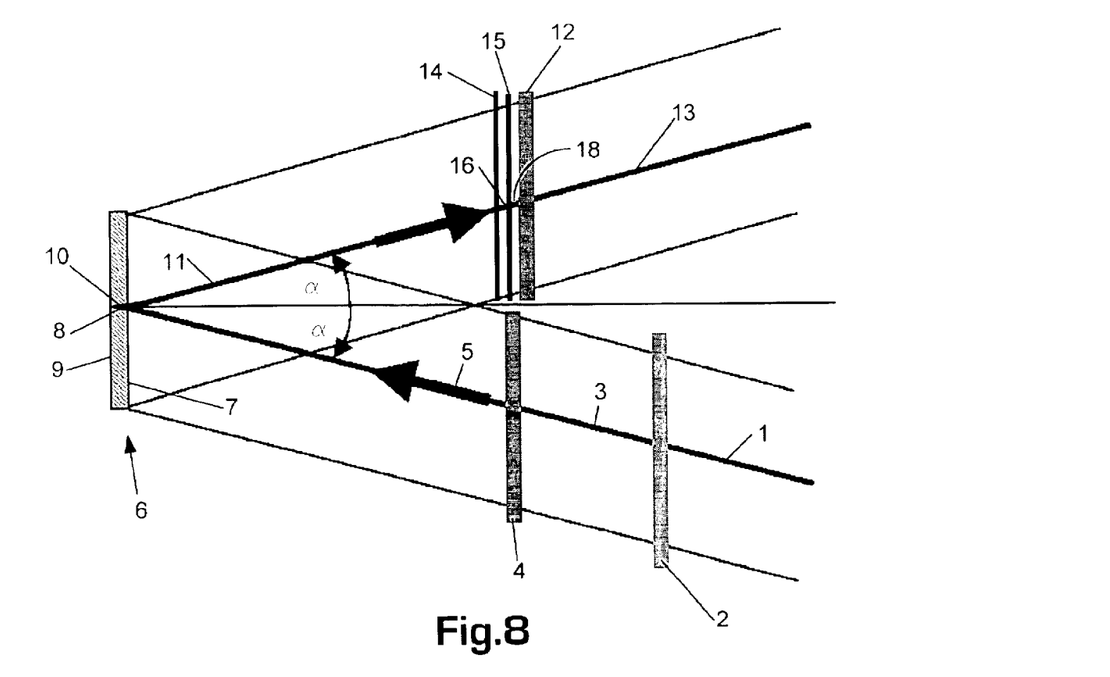
FIG. 8 is a light valve utilizing an off-axis reflective TN-LCD configuration with two retarders in the output path.

FIG. 8 is an off-axis reflective normally black 45° TN-LCD light valve as shown in FIG. 1 having optical retarder 14 and optical retarder 15 in the path of light 11 according to the present invention. While the figure represents only a 45° TN-LCD, it should be noted that the invention is applicable to all TN-LCDs having twists of 40° through 65°. The light 1 may be any non-polarized light, such as incandescent lighting, fluorescent lighting, or electroluminescent lighting, from any light source capable of producing non-polarized light. The angle α of the incident light is limited by the size of the magnifying optical components and the size of the system. Most off-axis systems have ac ranging from 10° to 20°. For the purposes of this invention, the system of FIG. 1, α=15°, although other angles may be used. Light 5 is incident on LC cell 6 at a nominal angle of about 15° from below at approximately a 270° azimuthal angle φ. For an optical system of F# of about 2.0, the half angle of the light cone is about 15°. This indicates that a contrast enhancement is required only for a part of the viewing area. Because the LC cell 6 is illuminated from about φ=270°, it is no longer required to maintain high on-axis contrast ratio. Referring to FIG. 8, a first retarder 14 and a second retarder 15 are placed between LC cell 6 and analyzer 12 in the path of reflected light 11. The effect that each optical retarder has on light is dependent on two factors: the retardation of the retarder for each color band, and the angle of the retarder 7 with respect to the horizontal axis.

Figure 9:
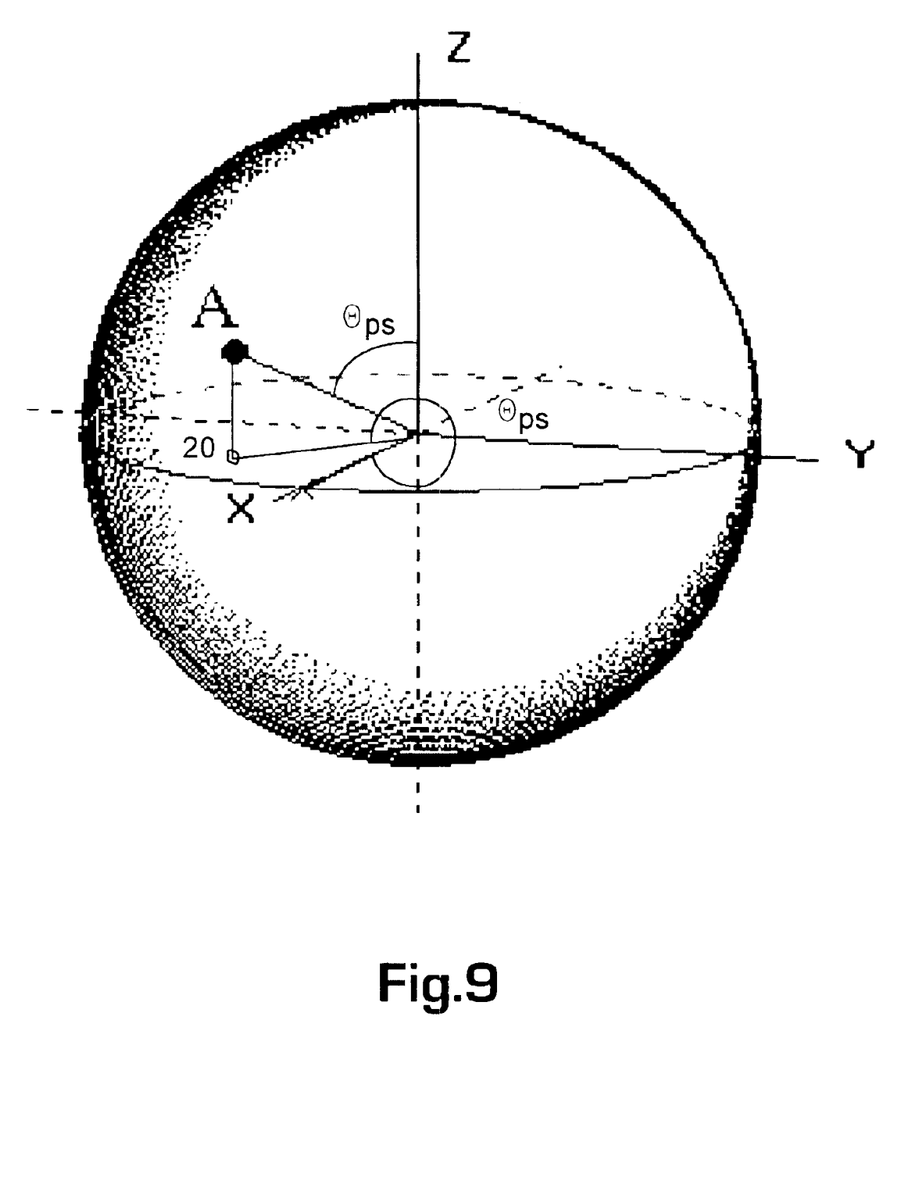
FIG. 9 is an representation of the polarization of light utilizing the Poincare sphere methodology.

FIG. 9 is a representation of a Poincare sphere method which can be used to calculate the retardation values of first retarder 14. The polarization state of light 11 when LC cell 6 is in the off state may be described by placing a point (A) on the surface of a Poincare sphere of radius unity. As illustrated in FIG. 3, light 11 has ellipticity (b/a) and major axis angle (ψ). The polar angle ($\theta_{PS}$) of the polarization state of light 11 (point A) is angle AOZ and can be calculated as $\theta_{PS}$=90−2 * $\tan^{-1}$ (b/a). On a Poincare sphere, the azimuthal angle $\phi_{PS}$ of light 11 is the angle between the x-axis and the projection of point A, point 20 on the x-y plane. The azimuthal angle can be described as φ=2*ψ.

Figure 10A:
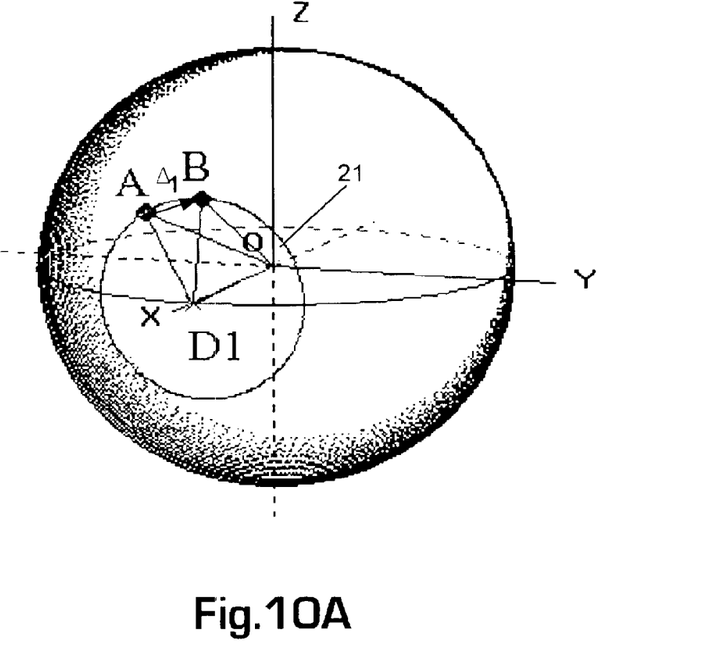
FIG. 10A is a representation of the Poincare sphere method used to calculate the value of a first retarder where two retarders are placed in the output path of the light valve.

Ignoring the fact that incident light 5 is off-axis to first retarder 14 and second retarder 15, one can calculate approximate values of retarders 14 and 15. As shown in FIG. 10A, first retarder 14 is placed at $D_1$, or the x-axis where $\gamma_1$=0, and functions to convert light having a polarization state represented by point A to light having a polarization state represented by point B. If one were to draw a circle 21 on the surface of the sphere centered at point $D_1$ and having point A along its circumference, different values of retardation will move point A along the circumference of circle 21 by $\Delta_1$ radians. The correct retardation of retarder 14 ($\delta_1$) is calculated such that point B is the point at which circle 21 intersects the x-z plane. Where represents the wavelength of light which is static throughout the system, the retardation $\delta_1$ can be calculated as $\delta_1$=($\Delta_1$*λ)/π. The retardation of retarder 14 was calculated for each of the color bands red, green and blue, where λ was set at the center wavelengths of 625 nm, 545 nm, and 455 nm respectively. After passing through first retarder 14, light 16 has a polarization state B, which lies in the x-z plane.

Figure 10B:
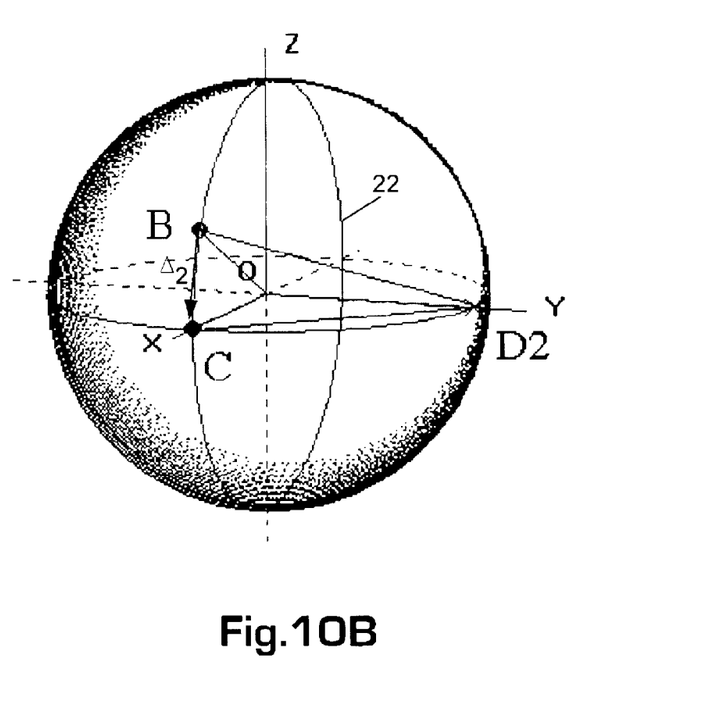
FIG. 10B is a representation of the Poincare sphere method used to calculate the value of a second retarder where two retarders are placed in the output path of the light valve.

Referring to FIG. 10B, a second retarder 15 is placed at $D_2$, or the y-axis where $\gamma_2$=45° and functions to convert light having a polarization state represented by point B to light having a polarization state represented by point C. If one were to draw another circle 22 at the x-z plane centered at point $D_2$ and having both points B and C in its circumference, different values of retardation will move point B along the circumference of circle 22 by $\Delta_2$ radians. Point C is the representation of linearly polarized light having a polarization state opposite that of analyzer 12 and equal to the polarization state of incident light 5. The correct retardation of retarder 15 ($\delta_2$) is calculated such that point C is the point at which circle 22 intersects the x-y plane. Where λ represents the wavelength of light, the retardation $\delta_2$ can be calculated as $\delta_2$=($\Delta_2$*λ)/π. The retardation of retarder 15 was calculated for each of the color bands red, green and blue, where λ was set at the center wavelengths of 625 nm, 545 nm, and 455 nm respectively. After passing through second retarder 15, light 17 has a polarization state C, which lies along the x-axis. Because light 17 is linearly polarized light having a polarization state exactly opposite that of analyzer 12, no light will pass through analyzer 12. Therefore, when LC cell 6 is in the off state, a minimal amount of light is able to pass through analyzer 12, thus creating a darker off state and increasing system contrast.

Once the retarder values are calculated, further optimization may be performed to compensate for the fact that light incident to the LC cell, polarizers and the retarders is 15° off-axis with a viewing cone dependent on the F# of the system. For example, a simulation program TwistOptics developed by Dr. Jack Kelly of Liquid crystal institute may be used to calculate bright and dark state light intensities. In the present invention, light having various wavelengths was used as follows: red range of 596–652 nm, green range of 516–572 nm, and blue range of 428–484 nm. The bright and dark states were calculated for the light valve of FIGS. 1 and 8 from various polar angles (0°–30°) and various azimuthal angles (0°–355°). This software accounts for the direction of light incident on each of the system elements, including polarizer 4, LC cell 6, analyzer 12 and retarders 14 and 15. The retarders 14 and 15 will have slightly different retardation when viewed at 15° as opposed to normal. This produces a retardation change of about 4%; however, the retardation value for each color band is optimized by calculating the overall contrast ratio in the viewing cone of interest. Contrast ratio is calculated by dividing the total bright state intensity by the total dark state intensity. Table 1 represents the ranges of retardation values $\delta_1$ and $\delta_2$ calculated for first retarder 14 and second retarder 15 respectively.

TABLE 1

|  | Red | Green | Blue |
| --- | --- | --- | --- |
| $\delta_1$ (nm) | 20 to 230 | 20 to 200 | 20 to 170 |
| $\gamma_1$ = 0° | centered at 110 | centered at 95 | centered at 85 |
| $\delta_2$ (nm) | −9.5 to 1 | −8 to 0 | −7 to 0 |
| $\gamma_2$ = 45° | centered at −5 | centered at −5 | centered at −4 |

Reflected light 11 is elliptically polarized light having a polarization axis significantly different than the polarization axis of incident light 5 when LC cell 6 is in the off state. First retarder 14 and second retarder 15 function to make light 17 more linear than light 11. Furthermore, after passing through first retarder 14 and second retarder 15, light 17 has a polarization axis closer to the polarization axis of incident light 5. Therefore, less light is able to pass through analyzer 12 when LC cell 6 is in the off state, yielding a darker off state, and more light is able to pass through analyzer 12 when LC cell 6 in is the on state, yielding a brighter on state. This results in a significantly increased contrast ratio.

Figure 11:
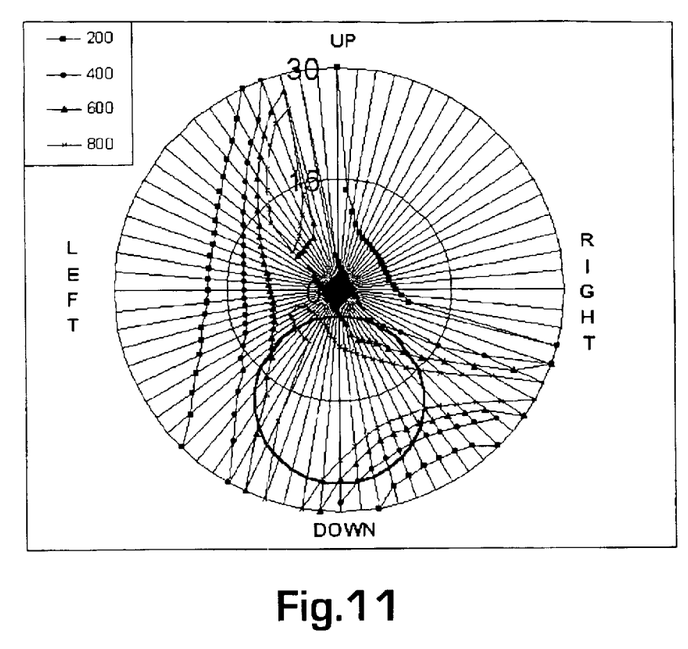
FIG. 11 is an iso-contrast plot for an off-axis reflective TN-LCD configuration with two retarders in the output path.

FIG. 11 shows an iso-contrast plot as in FIG. 4, but representing the light valve illustrated in FIG. 8 with first retarder 14 and second retarder 15 centered according to Table 1 and having $\gamma_1$ and $\gamma_2$ of 0° and 45° respectively. The plot is a contour of equal contrast lines for various polar and azimuthal angles. The iso-contrast plot provides an indication of where the high contrast region should lie in reference to a specific system configuration. In the present case, the light valve of FIG. 8 has a 15° polar angle and a 270° azimuthal angle. Compared to the plot of FIG. 4, the plot of FIG. 11 shows reduced areas of contrast variations within the viewing cone.

Figure 12:
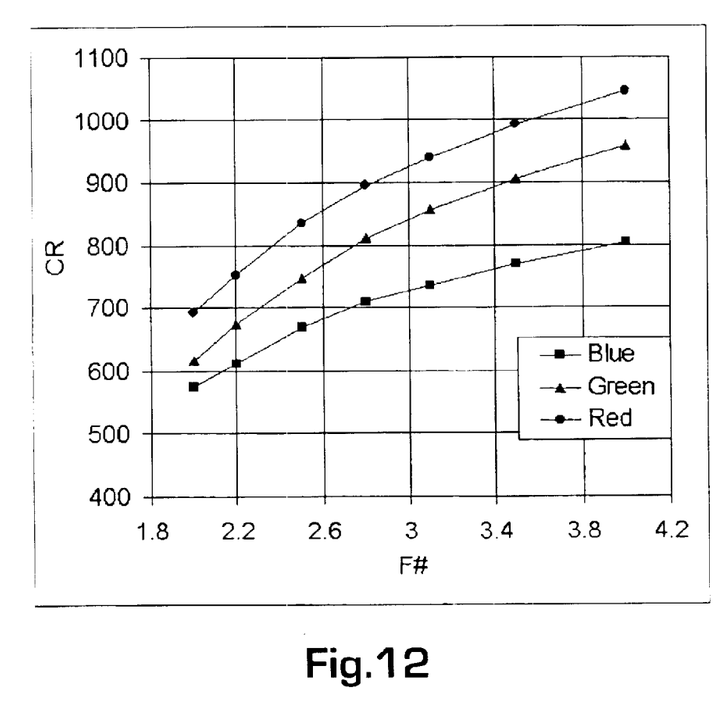
FIG. 12 is a plot of contrast ratio variation as a function of F# for an off-axis reflective TN-LCD configuration with two retarders in the output path.

FIG. 12 shows a plot of the calculated average contrast ratio as a function of F# for the light valve of FIG. 8. It is possible to achieve an average contrast ratio of more than 500:1 with this arrangement in the viewing cone of interest.

Figure 13:
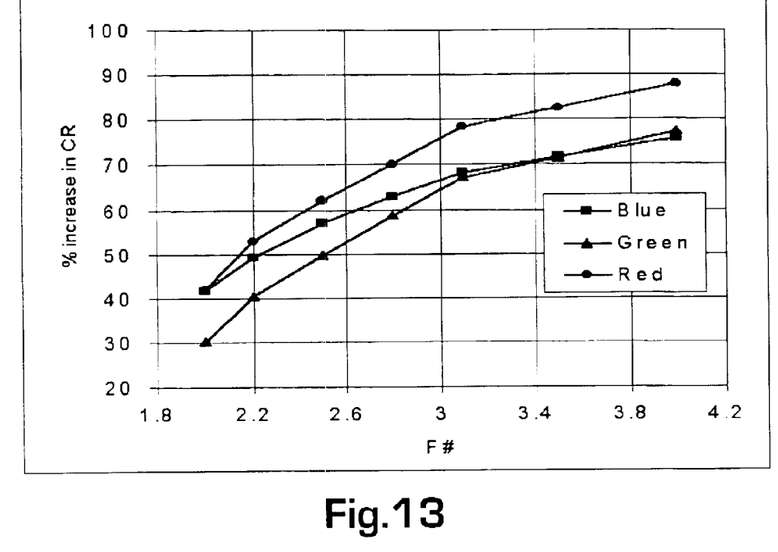
FIG. 13 is a plot of increase in contrast ratio as a function of F# when two retarders are placed in the output path.

FIG. 13 shows a comparison of the contrast ratio shown in FIGS. 5 and 12. Compared to the system without retarders shown in FIG. 1, there is a dramatic improvement in contrast ratio. The improvement in the contrast ratio ranges from 30% in blue band at F/2.0 to 88% for red band at F/4.0.

Figure 14:
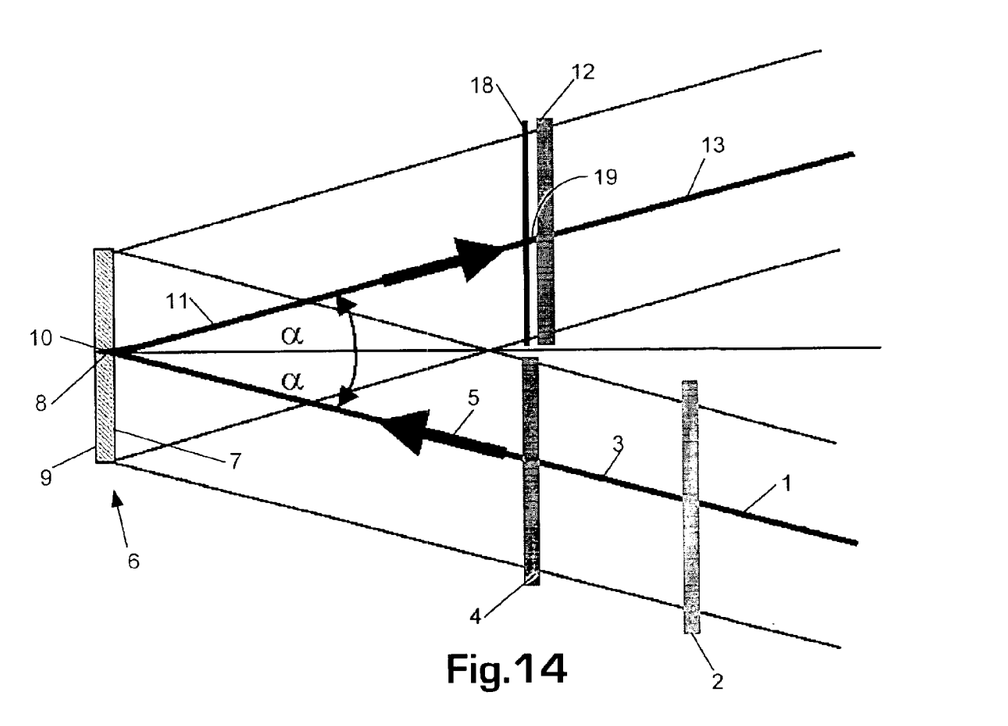
FIG. 14 is a light valve utilizing an off-axis reflective TN-LCD configuration with one retarder in the output path.

FIG. 14 depicts an alternate embodiment of the present invention, wherein only one retarder 18 is placed between LC cell 6 and analyzer 12 in the path of reflected light 11. Optical retarder 18 functions as does the combination of first retarder 14 and second retarder 15. When LC cell 6 is in the off-state, light 11 passes through retarder 18, and exits as light 19 having less ellipticity (having ellipticity closer to linear polarization) and an axis of polarization closer to the axis of polarization of incident light 5. This change in polarization and ellipticity allows the light valve to achieve a higher contrast ratio than would be possible without the use of retarder 18.

Light 11 is represented by point A on the surface of a Poincare sphere as shown in FIG. 9. The polarization state of light 11 when LC cell 6 is in the off state may be described by placing a point (A) on the surface of a Poincare sphere of radius unity. As illustrated in FIG. 3, light 11 has ellipticity (b/a) and major axis angle ($\psi$). The polar angle ($\theta_{PS}$) of the polarization state of light 11 (point A) is angle AOZ and can be calculated as $\theta_{PS}=90-2^*\tan^{-1}$ (b/a). On a Poincare sphere, the azimuthal angle $\phi_{PS}$ of light 11 is the angle between the x-axis and the point of projection 20 of point A onto x-y plane. The azimuthal angle can be described as $\phi=2^*\psi$.

Figure 15:
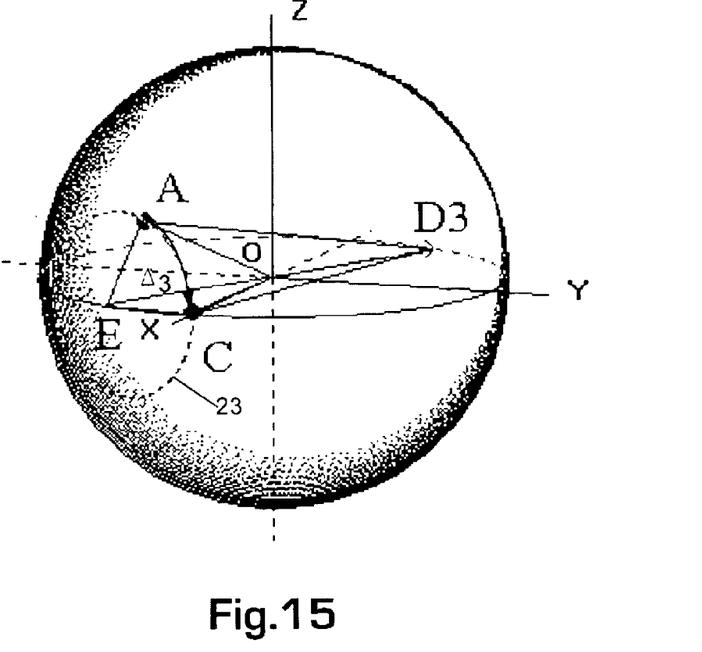
FIG. 15 is a representation of Poincare sphere method used to calculate the value of a single retarder placed in the output path of the light valve.

FIG. 15 is a representation of the Poincare sphere method that was used in calculating the retardation values of retarder 18. Retarder 18 functions to convert the polarization of reflected light 11 from polarization State A to light 19 having polarization State C. Retarder 18 is placed at $\gamma_3=89°$, represented in FIG. 15 by $D_3$. Point E is the point on the sphere diametrically opposed to point $D_3$. One may then draw another circle 23 centered at point E and having both points A and C in its circumference. Different values of retardation will move point A along the circumference of circle 23 by $\Delta_3$ radians to point C. The correct retardation of retarder 18 ($\delta_3$) is calculated such that point C is linearly polarized light represented along the x-axis of the Poincare sphere. Where $\delta$ represents the wavelength of light, the retardation $\delta_3$ can be calculated as $\delta_3$ ($\Delta_3^*\lambda)/\pi$. The retardation of retarder 18 was calculated for each of the color bands red, green and blue, where $\lambda$ was set at the center wavelengths of 625 nm, 545 nm, and 455 nm respectively. Because light 17 is linearly polarized light having a polarization state exactly opposite that of analyzer 12, no light will pass through analyzer 12. Therefore, when LC cell 6 is in the off state, a minimal amount of light is able to pass through analyzer 12, thus creating a darker off state and increasing system contrast.

Once the retarder value $\delta_3$ is calculated, further calculations known in the art may be performed to compensate for the fact that light incident to the retarder is 15° off-axis. The simulation program TwistOptics developed by Dr. Jack Kelly of Liquid crystal institute may be used to calculate bright and dark state light intensities. In the present invention, light having various wavelengths was used as follows: red range of 596–652 nm, green range of 516–572 nm, and blue range of 428–484 nm. The bright and dark states were calculated for light valve of FIGS. 1 and 14 from various polar angles (0°–30°) and various azimuthal angles (0°–355°). The retarder 18 has a slightly different retardation when viewed at 15° as opposed to normal. This produces a retardation change of about 4%; however, the retardation value for each color band is optimized by calculating the overall contrast ratio in the viewing cone of interest. Contrast ratio is calculated by dividing bright state intensity by dark state intensity. Table 2 represents the ranges of retardation values calculated for retarder 18.

TABLE 2

| Retarder | Red | Green | Blue |
|---|---|---|---|
| $\delta_3$ (nm) | 430 to 630 centered at 530 | 350 to 550 centered at 460 | 280 to 460 centered at 370 |
| $\gamma_3$ | 87.6° to 90.2° centered at 89° | 87.5° to 90.5° centered at 89° | 87.7° to 90.3° centered at 89° |

Figure 16:
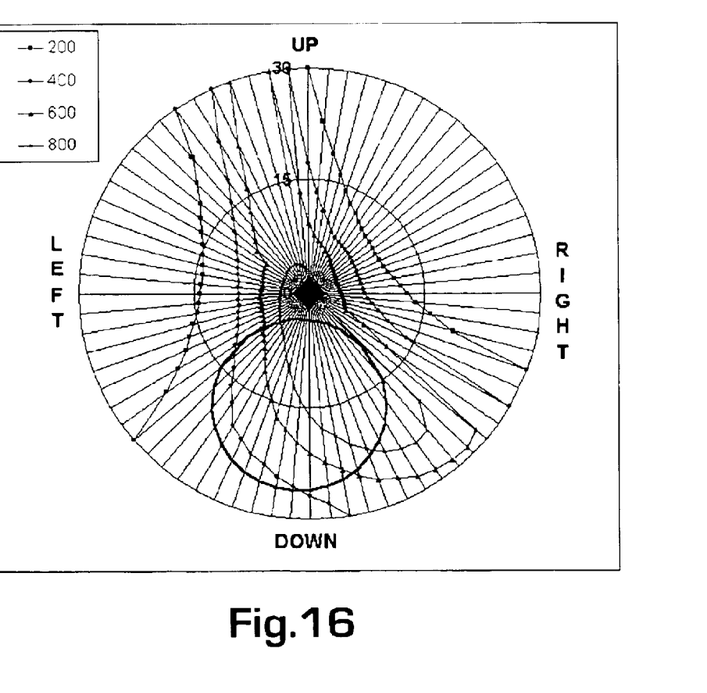
FIG. 16 is an iso-contrast plot for an off-axis reflective TN-LCD configuration with only one retarder in the output path.

FIG. 16 shows an iso-contrast plot as in FIG. 4, but representing the light valve illustrated in FIG. 14 with first retarder 18 being centered according to Table 2. The plot is a contour of equal contrast lines for various polar and azimuthal angles. The iso-contrast plot provides an indication of where the high contrast region should lie in reference to a specific system configuration. In the present case, the light valve of FIG. 14 has a 15° polar angle and a 270° azimuthal angle. Compared to the plot of FIG. 4, the plot of FIG. 16 shows enhanced contrast ratio characteristics in the lower part of the viewing cone.

Figure 17:
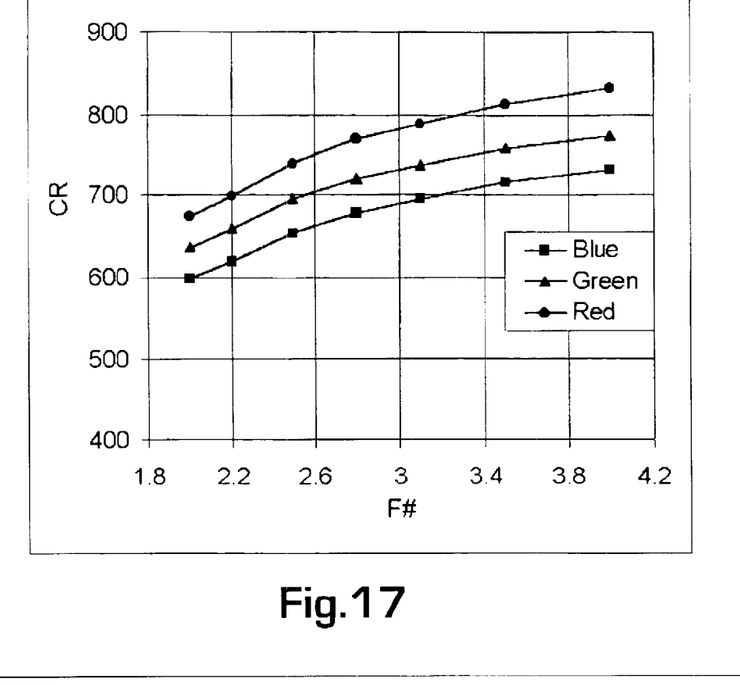
FIG. 17 is a plot of contrast ratio variation as a function of F# for an off-axis reflective TN-LCD configuration with only one retarder in the output path.

FIG. 17 shows a plot of the calculated average contrast ratio as a function of F# for the light valve of FIG. 14. It is possible to achieve an average contrast ratio of more than 500:1 with this arrangement in the viewing cone of interest.

Figure 18:
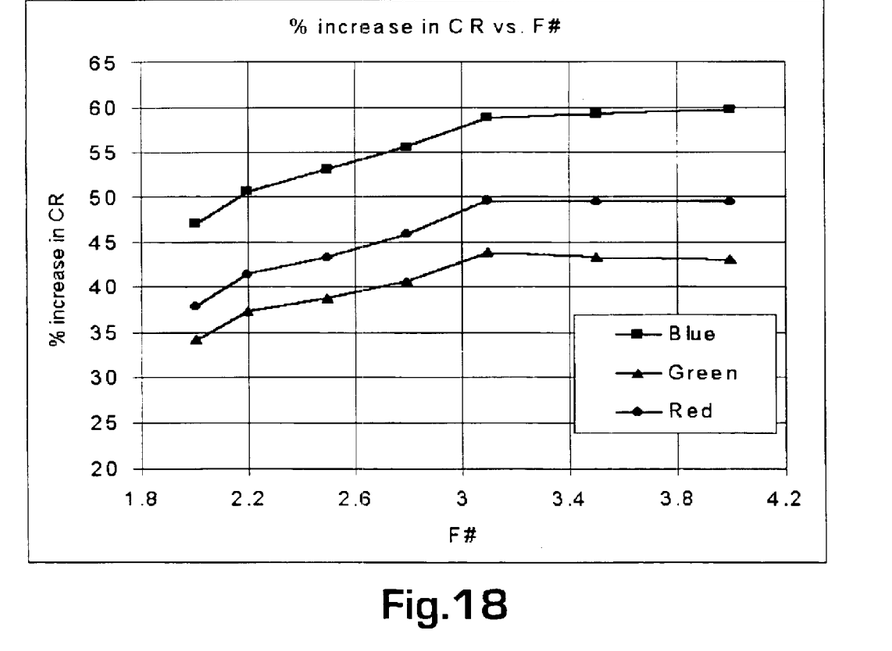
FIG. 18 is a plot of increase in contrast ratio as a function of F# when only one retarder is placed in the output path.

FIG. 18 shows a comparison of the contrast ratio shown in FIGS. 5 and 17. Compared to the system without retarders shown in FIG. 1, there is a significant improvement in contrast ratio. The improvement in the contrast ratio ranges from 34% in blue band at F/2.0 to 59% for red band at F/4.0.

The present invention has been described with reference to preferred embodiments. Obviously, it will be appreciated by those skilled in the art that various additions, modifications, deletions and alterations will occur to others upon a reading and understanding of this specification, and may be made to such preferred embodiments without departing from the spirit and scope of the invention. Accordingly, it is intended that all such modifications and alterations be included within the scope of the invention as defined in the following claims.

What is claimed is:

1. A light valve for use in high contrast reflective microdisplays, comprising:

a twisted nematic mode reflective liquid crystal cell;

a color filter positioned to accept non-polarized light incident to the light valve;

a linear polarizer positioned between said color filter and said liquid crystal cell to impart a polarization to the incident light;

an analyzer positioned in the path of the light reflected by said liquid crystal cell; and a retarder positioned between said liquid crystal cell and said analyzer in the path of the light reflected by said liquid crystal cell, the retarder having a retardation valuu ranging from 430 nanometers to 630 nanometers to reduce ellipticity of the reflected light and a retardation angle ranging from 87.6° to 90.2° in a red band of light;

wherein light incident to the light valve is generally off-axis to said liquid crystal cell, and whereby polarization axes of light incident and light reflected are generally matched when the liquid crystal cell as in an off state.

2. The light valve of claim 1 wherein said liquid crystal cell is an LCoS cell.

3. The light valve of claim 2 wherein light incident to the light valve is 15° off-axis.

4. The light valve of claim 1 wherein light incident to the light valve is between 10° and 20° off-axis.

5. The light valve of claim 1 wherein said liquid crystal cell has a twist angle ranging from 40° to 65°.

6. The light valve of claim 5 wherein said liquid crystal cell is in twisted nematic mode.

7. The light valve of claim 1 wherein the horizontal axis of said polarizer and the horizontal axis of said analyzer are 90° apart.

8. The light valve of claim 1 wherein said retarder has a retardation value centered at 530 nanometers and a retardation angle centered at 89° in a red band of light.

9. A light valve for use in high contrast reflective microdisplays, comprising:
  a twisted nematic mode reflective liquid crystal cell;
  a color filter positioned to accept non-polarized light incident to the light valve;
  a linear polarizer positioned between said color filter and said liquid crystal cell to impart a polarization to the incident light;
  an analyzer positioned in the path of the light reflected by said liquid crystal cell; and
  a retarder positioned between said liquid crystal cell and said analyzer in the path of the light reflected by said liquid crystal cell, the retarder having a retardation value ranging from 350 nanometers to 550 nanometers to reduce ellipticity of the reflected light and a retardation angle ranging from 87.5° to 90.5° in a green band of light;
  wherein light incident to the light valve is generally off-axis to said liquid crystal cell, and whereby polarization axes of tight incident and light reflected are generally matched when the liquid crystal cell is in an off state.

10. The light valve of claim 9 wherein said retarder has a retardation value centered at 460 nanometers and a retardation angle centered at 89° in a green band of light.

11. A light valve for use in high contrast reflective microdisplays, comprising:
  a twisted nematic mode reflective liquid crystal cell;
  a color filter positioned to accept non-polarized light incident to the light valve;
  a linear polarizer positioned between said color filter and said liquid crystal cell to impart a polarization to the incident light;
  an analyzer positioned in the path of the light reflected by said liquid crystal cell;
  and a rctarder pozilioned between said liquid crystal cell and said analyzer in the path of the light reflected by said liquid crystal cell, the retarder having a retardation value ranging from 280 nanometers to 460 nanometers to reduce ellipticily of the reflected light and a retardation angle ranging from 87.7° to 90.3° in a blue band or light:
  wherein light incident to the light valve is generally off-axis to said liquid crystal cell, and whereby polarization axes of light incident and light reflected are generally matched when the liquid crystal cell is in an off stale.

12. The light valve of claim 11 wherein said first retarder has a retardation value centered at 370 nanometer and a retardation angle centered at 89° in a blue band of light.

* * * * *